United States Patent
Morita et al.

(10) Patent No.: US 8,084,162 B2
(45) Date of Patent: Dec. 27, 2011

(54) FUEL CELL AND FUEL CELL APPARATUS WITH A SWITCH RESPONSIVE TO AN AMOUNT OF WATER CONTAINED IN THE ELECTROLYTE MEMBRANE

(75) Inventors: Akira Morita, Tokyo (JP); Akiyoshi Yokoi, Yokohama (JP); Toru Nakakubo, Kawasaki (JP); Satoshi Mogi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 11/996,461

(22) PCT Filed: May 18, 2007

(86) PCT No.: PCT/JP2007/060660
§ 371 (c)(1),
(2), (4) Date: Jan. 22, 2008

(87) PCT Pub. No.: WO2007/138992
PCT Pub. Date: Dec. 6, 2007

(65) Prior Publication Data
US 2009/0035628 A1 Feb. 5, 2009

(30) Foreign Application Priority Data
May 26, 2006 (JP) .................................. 2006-146200

(51) Int. Cl.
*H01M 8/04* (2006.01)
(52) U.S. Cl. ........................... 429/429; 429/428; 429/450
(58) Field of Classification Search ...................... 429/34
See application file for complete search history.

(56) References Cited

U.S. PATENT DOCUMENTS

| 6,214,487 | B1 | 4/2001 | Kelley et al. |
| 7,226,678 | B2 | 6/2007 | Kato et al. |
| 2004/0009384 | A1 | 1/2004 | Mathias et al. |
| 2004/0175602 | A1* | 9/2004 | Tahara ............................. 429/23 |
| 2005/0037247 | A1* | 2/2005 | Takahashi ....................... 429/23 |
| 2005/0069751 | A1 | 3/2005 | Zhang et al. |
| 2007/0154749 | A1 | 7/2007 | Kato et al. |

FOREIGN PATENT DOCUMENTS

| CN | 1359545 A | 7/2002 |
| JP | 2-33866 A | 2/1990 |
| JP | 10-144334 A | 5/1998 |
| JP | 2003-109636 A | 4/2003 |
| JP | 2004-253366 A | 9/2004 |
| JP | 2004-288575 A | 10/2004 |
| JP | 2005-174742 A | 6/2005 |
| JP | 2006-32252 A | 2/2006 |
| JP | 2003-115305 A | 1/2008 |
| WO | 00/45450 A2 | 8/2000 |
| WO | 2007-052500 A1 | 5/2007 |

* cited by examiner

*Primary Examiner* — Basia Ridley
*Assistant Examiner* — Sean P Cullen
(74) *Attorney, Agent, or Firm* — Fitzpatrick, Cella, Harper & Scinto

(57) ABSTRACT

In a case of consuming a power generation reaction inducing gas, which causes lowering in performance and degradation of a fuel cell during suspension of operation thereof, and in a case of performing warm up at a time of activation at low temperatures, in order to automatically perform short circuiting control, there is provided a fuel cell having a structure including a switch which is switchable in accordance with a state of containing water generated in a power generation portion.

7 Claims, 5 Drawing Sheets

FUEL CELL AND FUEL CELL APPARATUS WITH A SWITCH RESPONSIVE TO AN AMOUNT OF WATER CONTAINED IN THE ELECTROLYTE MEMBRANE

TECHNICAL FIELD

The present invention relates to a fuel cell and a fuel cell apparatus, and more particularly, to a fuel cell which can suppress lowering in performance and degradation during suspension of operation of the fuel cell, and can perform warm up at the time of activation at low temperatures.

BACKGROUND ART

A polymer electrolyte fuel cell (or proton exchange membrane fuel cell) has advantages such as a long life, a high output, less degradation due to activation/suspension, low operating-temperature, and easy activation/suspension.

For those advantages, the fuel cell is expected to be used in a wide range of applications including a power source for a portable device such as a digital camera, a digital camcorder, a mobile phone, or a notebook personal computer, a power source for an electric automobile, and a distributed power source for business or household use.

Of those applications, the portable device (for example, digital camera) having the polymer electrolyte fuel cell mounted thereon is advantageous in that the it can be used for a longer period of time than that of a portable device having a lithium ion battery, which is mainstream now, mounted thereon.

Recently, since the power consumption of the portable device increases steadily, and therefore since there is a fear that use of only the lithium ion battery may lead to power shortage, there is a need for rapid development of a fuel cell with a high efficiency. For this reason, in the technical field of the fuel cell, various improvements are being made in a membrane electrode assembly, a cell structure, power generation conditions, and the like.

Meanwhile, in a power generation system having the polymer electrolyte fuel cell mounted thereon, there are cases where lowering of output may be caused by repeated activation and suspension according to the conditions.

In particular, at the time of suspension of the power generation system, when a power generation reaction inducing gas such as a fuel gas or oxidizer gas remains in the fuel cell, there is a fear of causing degradation such as lowering of output voltage and corrosion of constituting components.

For that reason, hitherto, as disclosed in Japanese Patent Application Laid-Open No. H02-33866, there has been proposed an operation suspension method for a power generation system in which an inert gas is used to purge a power generation reaction inducing gas in a phosphoric acid fuel cell system. In the operation suspension method, in order to prevent the degradation of the fuel cell during suspension thereof, a fuel remaining in a fuel path is purged by nitrogen, while an oxidizer electrode and a fuel electrode are short-circuited, whereby oxygen dissolved in phosphoric acid impregnated in an electrolyte layer is removed.

At that time, in order to bring the oxidizer electrode and the fuel electrode into a short-circuited state and then into open-circuit state, a timer is utilized.

Further, Japanese Patent Application Laid-Open No. H10-144334 discloses that at the time of suspension of the operation of a fuel cell, an inert gas (nitrogen gas) is supplied to each of an anode and a cathode to remove hydrogen and oxygen remaining in the cell, while a dummy resistor is connected between the electrodes to cause short circuiting.

On the other hand, in order to attain space saving and size reduction of a power generation system, adoption of an operation suspension method using no inert gas is advantageous. Therefore, in Japanese Patent Application Laid-Open No. 2003-115305, it is proposed that an external resistor which allows a feeble current to flow is connected to each pair of separators of a fuel cell.

Japanese Patent Application Laid-Open No. 2003-115305 discloses that an external resistor is provided with a switch, and when the operation of the fuel cell is suspended, the switch of the external resistor is closed, and a feeble electric current is allowed to flow between each pair of separators of a fuel cell, thereby consuming a residual gas.

In addition, the fuel cell has an extremely small output at low temperatures, so that a desired output cannot be obtained. Therefore, it is required to warm up the fuel cell.

Japanese Patent Application Laid-Open No. 2003-115305 discloses that after the suspension of the operation of the fuel cell utilizing the above-mentioned method, by keeping the switch in a closed state until subsequent activation, warm up for the subsequent activation can be performed. Further, Japanese Patent Application Laid-Open No. 2003-109636 discloses a structure in which a short-circuiting circuit for short-circuiting electrodes of a fuel cell unit is provided, and by causing short circuiting of the short-circuiting circuit, warm up of the fuel cell is performed. At that time, when the temperature becomes less than a predetermined temperature, the short-circuiting circuit is closed, and when the temperature becomes not less than the predetermined temperature, the short-circuiting circuit is opened.

However, there are the following problems with the conventional technique of preventing the fuel cell from being degraded during suspension of the operation thereof, and of performing warm up at the time of activation at low temperatures.

In the fuel cell to be mounted on a portable device, the space for housing the fuel cell is limited, so that it is required to adopt a control unit which is as compact as possible.

In contrast, in the fuel cell systems as disclosed in Japanese Patent Application Laid-Open Nos. H02-033866 and H10-144334, in which the fuel remaining in the fuel path is purged by use of nitrogen, a purge gas supply unit is additionally required.

Consequently, with the above-mentioned conventional technique, there arises a disadvantage in reducing the size of the fuel cell system.

Further, the technique of performing warm up at the time of activation of the fuel cell at low temperatures disclosed in Japanese Patent Application Laid-Open No. 2003-109636 above has a problem of being influenced by the temperature of use environment or the like.

That is, in this technique, for opening/closing the short-circuiting circuit operated at the time of warm up, a variable resistive element whose resistance value reversibly changes based on the element temperature is used. Therefore, the technique has a problem that the operation conditions depend on the temperature during use.

DISCLOSURE OF THE INVENTION

The present invention is directed to a fuel cell and a fuel cell apparatus that are hardly influenced by the environmental temperature, realized in space-saving, and provided with a switch which can automatically perform switching.

That is, the present invention relates to a fuel cell and a fuel cell apparatus that can efficiently control short circuiting by use of the switch, in a case of consuming a power generation reaction inducing gas, which causes lowering in performance or degradation during suspension of operation of the fuel cell, or in a case of performing warm up at a time of activation at low temperatures.

According to an embodiment of the present invention, there is provided a fuel cell which has a power generation portion including a membrane electrode assembly including an oxidizer electrode and a fuel electrode disposed with an electrolyte membrane interposed therebetween and has a structure including a switch which is switchable in accordance with a state of containing water generated in the power generation portion.

According to the present invention, a fuel cell and a fuel cell apparatus can be realized which are hardly influenced by the environmental temperature, realized in space-saving, and provided with a switch which can automatically perform switching.

In particular, by providing the switch in a short-circuiting circuit connected between the oxidizer electrode and the fuel electrode, in a case of consuming a power generation reaction inducing gas, which causes lowering in performance or degradation during suspension of operation of the fuel cell, or in a case of performing warm up at a time of activation at low temperatures, short circuiting control can be efficiently performed.

BEST MODES FOR CARRYING OUT THE INVENTION

Embodiments of the present invention will be described with reference to the attached drawings.

Embodiment 1

Figure 1:
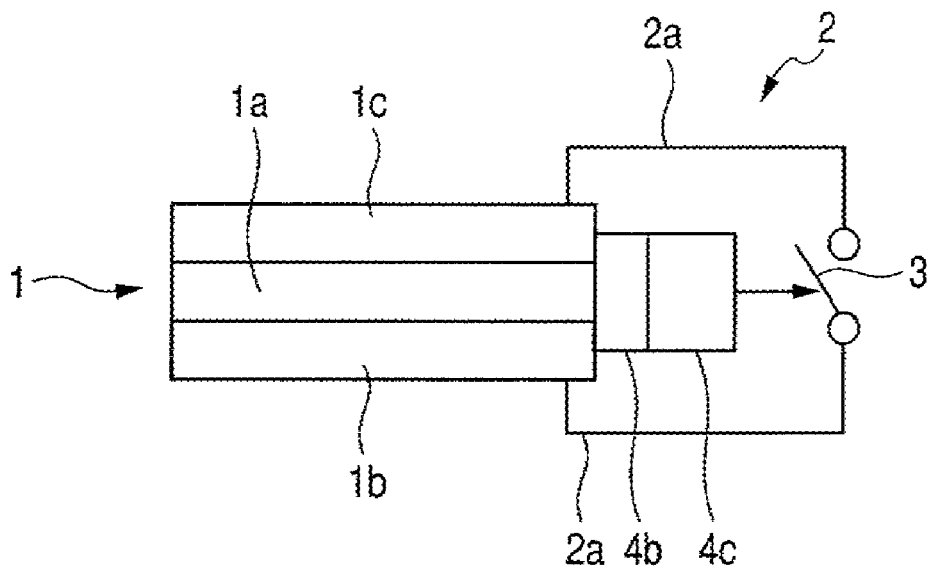
FIG. 1 is a schematic structural view of a fuel cell apparatus according to Embodiment 1 of the present invention.

FIG. 1 is a schematic structural view for illustrating a fuel cell apparatus according to Embodiment 1.

In FIG. 1, a power generation portion 1 includes a membrane electrode assembly in which a fuel electrode 1$b$ to which a fuel is supplied and an oxidizer electrode 1$c$ to which an oxidizer is supplied are disposed with an electrolyte membrane 1$a$ interposed therebetween.

A short-circuiting circuit 2 is provided for short circuiting the fuel electrode 1$b$ and the oxidizer electrode 1$c$ of the power generation portion 1. A switch 3 is provided in the short-circuiting circuit 2. The switch 3 is controlled to be opened and closed by a controller 4$c$ in accordance with an output signal of a water content sensor 4$b$ provided in contact with the electrolyte membrane 1$a$.

The membrane electrode assembly of the power generation portion 1 has a structure in which on the surfaces of the electrolyte membrane 1$a$, the fuel electrode 1$b$ and the oxidizer electrode 1$c$ are provided, respectively, as electrodes including a catalyst.

For the electrolyte membrane 1$a$, for example, a proton conductive polymer material, specifically, an ion exchange membrane such as a perfluorocarbon ion exchange membrane, a non-perfluorinated ion exchange membrane, or a hybrid ion exchange membrane is used. However, the present invention is not limited particularly to those materials.

The fuel electrode 1$b$ and the oxidizer electrode 1$c$ are formed by applying, for example, a paste including carbon powder carrying platinum fine particles and a proton conductive polymer material to the surfaces of the electrolyte membrane 1$a$ by screen printing. However, the present invention is not particularly limited to the above-mentioned materials and method.

In the fuel electrode 1$b$, the fuel is oxidized by an oxidizing action of the catalyst contained in the fuel electrode 1$b$ to generate protons. For the fuel, in general, gas such as hydrogen, or a liquid such as methanol or ethanol is used.

The protons generated in the fuel electrode 1$b$ moves toward the oxidizer electrode 1$c$ while being hydrated with water molecules existing in the proton electrolyte membrane 1$a$. Accordingly, the more water exists in the electrolyte membrane 1$a$, the easier the movement of the protons becomes, thereby making the power generation reaction active. When a state called "dry-out" is caused in which sufficient water does not exist in the electrolyte membrane 1$a$, the power generation reaction will be inhibited.

In the oxidizer electrode 1$c$, by oxidizing the protons which have moved in the electrolyte membrane 1$a$ by the oxidizer, water is generated. Further, a part of energy generated by the series of chemical reactions is extracted as an electrical energy. For the oxidizer, oxygen in atmosphere is generally used. The water generated by the power generation reaction normally moves in the form of water vapor or liquid together with a flow of the oxidizer from the oxidizer electrode and is discharged to the outside. In some cases, the water is discharged from the fuel electrode side through the membrane electrode assembly.

Accordingly, the more oxygen in the atmosphere surrounding the oxidizer electrode 1$c$, the easier the oxidization of the protons becomes, thereby making the power generation reaction active. When the water generated in the oxidizer electrode 1$c$ is not sufficiently discharged, and a state called "flooding" is caused in which supply of the oxidizer is interrupted by the water in a liquid state, the power generation reaction will be inhibited.

As described above, the amount of water (water-containing state) in the electrolyte membrane 1$a$ is an important parameter which greatly influences the power generation reaction of the fuel cell.

The short-circuiting circuit 2 includes oxidizer electrode 1$c$ and the fuel electrode 1$b$ connected to each other through a conductive member 2$a$. The short-circuiting circuit 2 is provided with the switch 3, so that the opening/closing of the circuit can be performed therewith.

The water content sensor 4$b$ can be of any type and size as long as it can detect the water-containing state of the electrolyte membrane 1$a$ and can detect a water content at which the switch is to be opened/closed. Further, the controller 4c opens/closes the switch 3 based on an output signal of the water content sensor 4b.

In this embodiment, the water content sensor 4b detects the water-containing state of the electrolyte membrane 1a, and in a state where the water in the electrolyte membrane 1a is insufficient, the controller 4c performs such control that the switch 3 is closed. Further, when water is generated in the power generation portion 1 by the power generation reaction thereof and it is determined that the water in the electrolyte membrane 1a has increased to a sufficient amount, the controller 4c performs such control that the switch 3 is opened.

Embodiment 2

Figure 2:
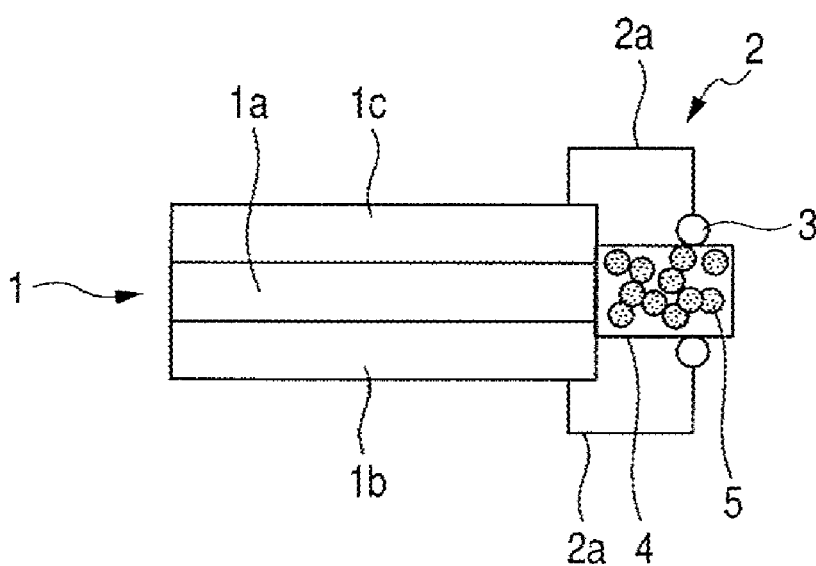
FIG. 2 is a schematic structural view of a fuel cell apparatus according to Embodiment 2 of the present invention.

FIG. 2 is a schematic structural view for illustrating a fuel cell apparatus according to Embodiment 2 of the present invention.

In FIG. 2, a short-circuiting circuit 2 is provided for short-circuiting a fuel electrode 1b and an oxidizer electrode 1c of a power generation portion 1, and a switch 3 is provided in the short-circuiting circuit 2. The switch 3 is composed of a water absorbing material 4 provided in contact with the power generation portion 1 and conductive elements 5 contained therein.

The description of the membrane electrode assembly of the power generation portion 1 is omitted because the membrane electrode assembly is the same as that of Embodiment 1.

In this embodiment, the switch 3 has a function of opening/closing the short-circuiting circuit 2. A part of the switch 3 is comprised of the water absorbing material 4 which contains the conductive elements 5, and is structured so as to expand/contract depending on the amount of water generated by the power generation reaction, thereby allowing the switch to be opened/closed.

Specifically, when water is generated in the power generation portion 1 through the power generation reaction thereof, the water absorbing material 4 absorbs the water to increase the volume thereof, so that the switch 3 is opened. When the power generation is suspended and the power generation portion 1 is dried, the water absorbing material 4 contracts to close the switch 3.

In a case where the generation of water in the power generation portion 1 suspends after the suspension of the power generation, the water absorbing material 4 gradually contracts as the drying thereof proceeds. As a result, the conductive elements 5 come into contact with one another, thereby constituting the short-circuiting circuit 2. The density of the conductive elements 5 to be contained in the water absorbing material 4 is determined so as to provide sufficient conductivity at this time. Further, such a constitution is also adopted that when the water absorbing material 4 absorbs the water to increase the volume thereof, the conductive elements 5 become more distant from each other, whereby the resistance increases to open the switch.

For the water absorbing material 4, a material having a water absorption rate of 10 to 90% is preferable. When the water absorption rate of the water absorbing material is less than 10%, the water absorption amount is insufficient, so that it is difficult to obtain a sufficient volume change for attaining the opening/closing of the switch 3.

In contrast, a material having a water absorption rate of more than 90% includes too many pores, so that it is difficult to ensure the mechanical strength thereof as a switch.

The term "water absorption rate" of the water absorbing material 4 herein employed is defined by the following equation:

Water Absorption Rate=$(B-A) \div A \times 100(\%)$ wherein the weight of the water absorbing material 4 which has been dried at a temperature of 100° C. to 110° C. until a constant weight is reached is represented by A and the weight of the water absorbing material 4 when the surface thereof is dried while the inside thereof is in a water-saturated state is represented by B.

Here, examples of the material used for the water absorbing material 4 includes acrylate polymer, methacrylate polymer, hydrogel, water-swellable rubber, and bentonite. However, the present invention is not limited thereto.

As will be described in Embodiment 4 later, as long as the water absorbing material 4 can receive water generated in the power generation portion 1, the water absorbing material 4 may be provided distant from the membrane electrode assembly. However, by providing the water absorbing material 4 in contact with the membrane electrode assembly, the water absorbed from the power generation portion 1 when the power generation portion 1 is sufficiently wet can be supplied to the power generation portion 1 when the power generation portion 1 is in a dry state. In this case, by adjusting the type and amount used of the water absorbing material 4 and the contact area thereof with the power generation portion 1, the amount of water contained in the membrane electrode assembly of the power generation portion 1 can be controlled, thereby reducing the possibility of the occurrence of the above described inhibition of the power generation reaction due to the dry-out or flooding.

The conductive element 5 can be made of metal or carbon. The shape thereof is not particularly limited, but a particulate shape, a columnar shape, a disk shape, and a linear shape are preferable.

The content of the conductive elements 5 in the water absorbing material 4 is preferably 20 wt. % to 99 wt. %, more preferably 50 wt. % to 97 wt. %.

This is because, when the content of the conductive elements 5 is less than 20 wt. %, sufficient conductivity cannot be obtained, and when the content is more than 99 wt. %, sufficient mechanical strength cannot be obtained.

In particular, by providing the conductive elements in a part of the electrolyte membrane and allowing the conductive elements to have a function of a switch, there is no need for providing a circuit outside the power generation portion, so that any additional space for providing a circuit is not required, whereby the space can be effectively utilized.

Next, the operations at the time of activation or suspension of the fuel cell will be described.

At the time of suspension of the fuel cell, any water is not generated in the power generation portion 1, the water absorbing material 4 contracts, and the switch 3 is closed to constitute a short-circuited state.

In this case, when the fuel cell is activated and the fuel is supplied to the power generation portion 1, the power generation is caused, and an electric current flows in the short-circuiting circuit 2. At the same time, water is generated in the power generation portion 1.

The water absorbing material 4 absorbs the thus generated water to increase the volume thereof, whereby the switch 3 is opened to cancel the short circuiting.

Next, when the fuel cell is suspended, water is not generated any more, so that with the progress of drying of the power generation portion 1, the water absorbing material 4 is also dried to reduce the volume thereof.

As a result, the switch 3 is closed to constitute a short-circuited state. When the power generation portion 1 is in the short-circuited state, a fuel remaining on the fuel electrode side is quickly consumed, whereby the degradation of the fuel cell can be suppressed.

Further, in the case of activating the fuel cell, the warm up can quickly be performed because the switch is in a short-circuited state during suspension before the activation as described above.

In Embodiment 2, the water content sensor and the controller used in Embodiment 1 are not required, so that the fuel cell can be reduced in size and a separate power source is not required, which is more preferable.

Embodiment 3

Figure 3:
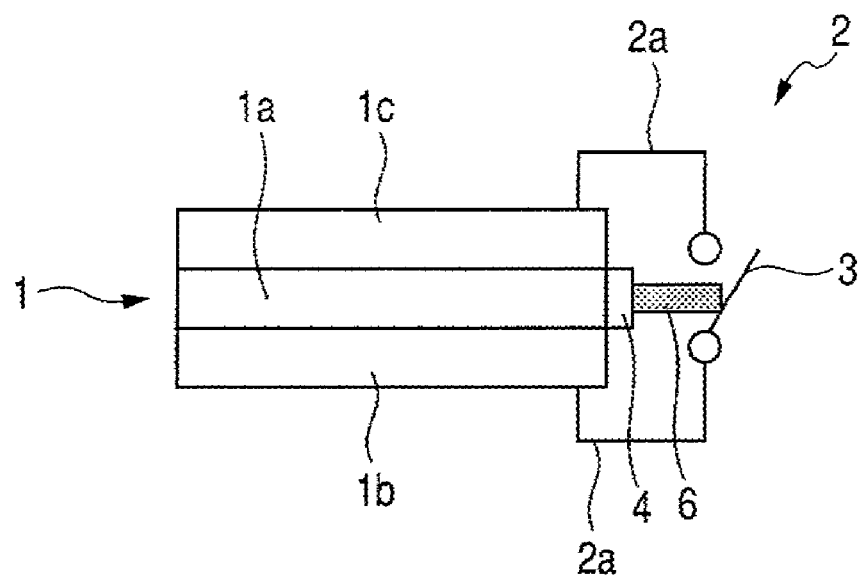
FIG. 3 is a schematic structural view of a fuel cell apparatus according to Embodiment 3 of the present invention.

FIG. 3 is a schematic structural view for illustrating a fuel cell apparatus according to Embodiment 3 of the present invention.

In Embodiment 3, a water absorbing material 4 is provided with a support member 6, whereby due to a change in volume of the water absorbing material 4, an opening/closing portion of a switch 3 which is normally closed is pushed up to open the switch 3.

Embodiment 4

Figure 4:
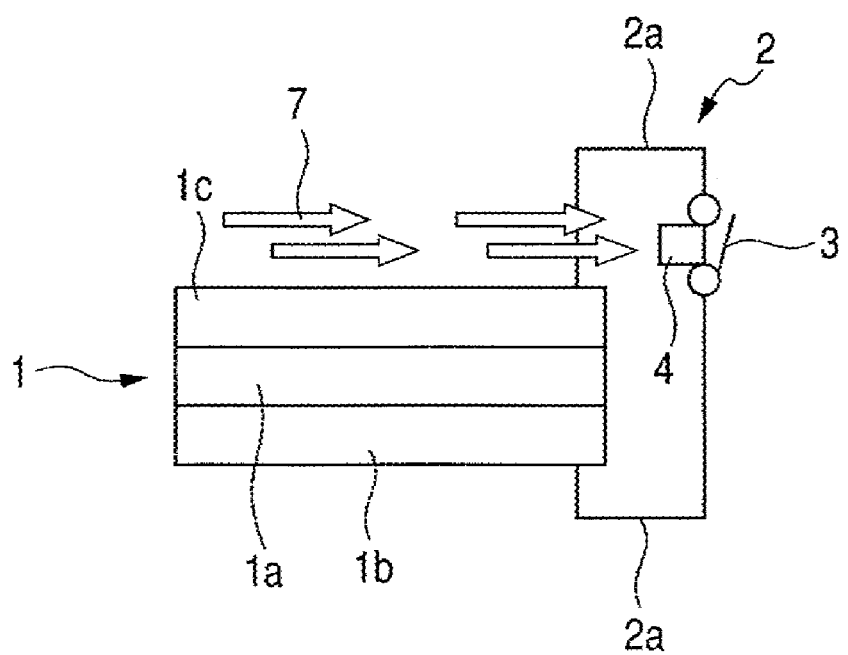
FIG. 4 is a schematic structural view of a fuel cell apparatus according to Embodiment 4 of the present invention.

FIG. 4 is a schematic structural view for illustrating a fuel cell apparatus according to Embodiment 4 of the present invention.

In Embodiment 4, a structure is adopted such that a water absorbing material 4 is provided on a flow path of an oxidizer gas 7, whereby the water absorbing material 4 can absorb water contained in the gas discharged from the power generation portion 1 to increase the volume, thereby opening a switch.

Embodiment 5

Figure 5:
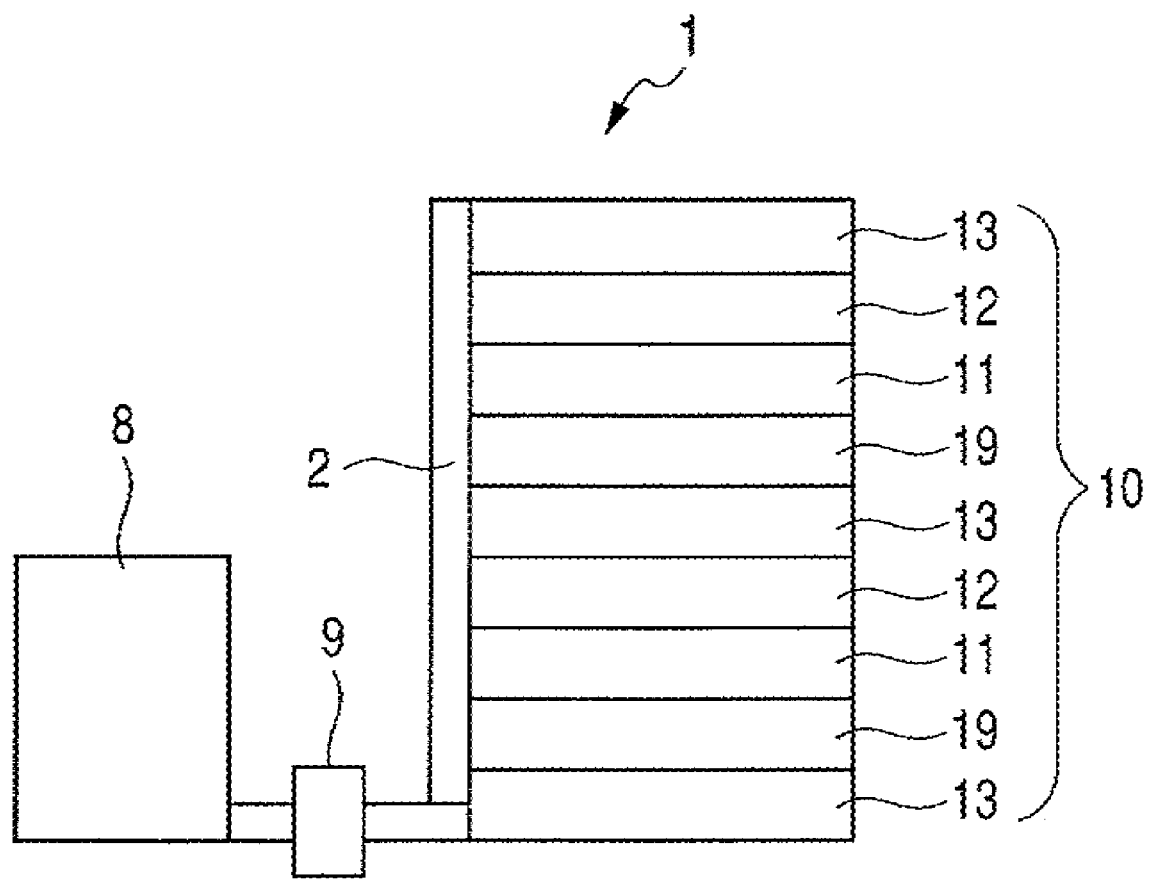
FIG. 5 is a schematic structural view of a fuel cell apparatus according to Embodiment 5 of the present invention.
Figure 6:
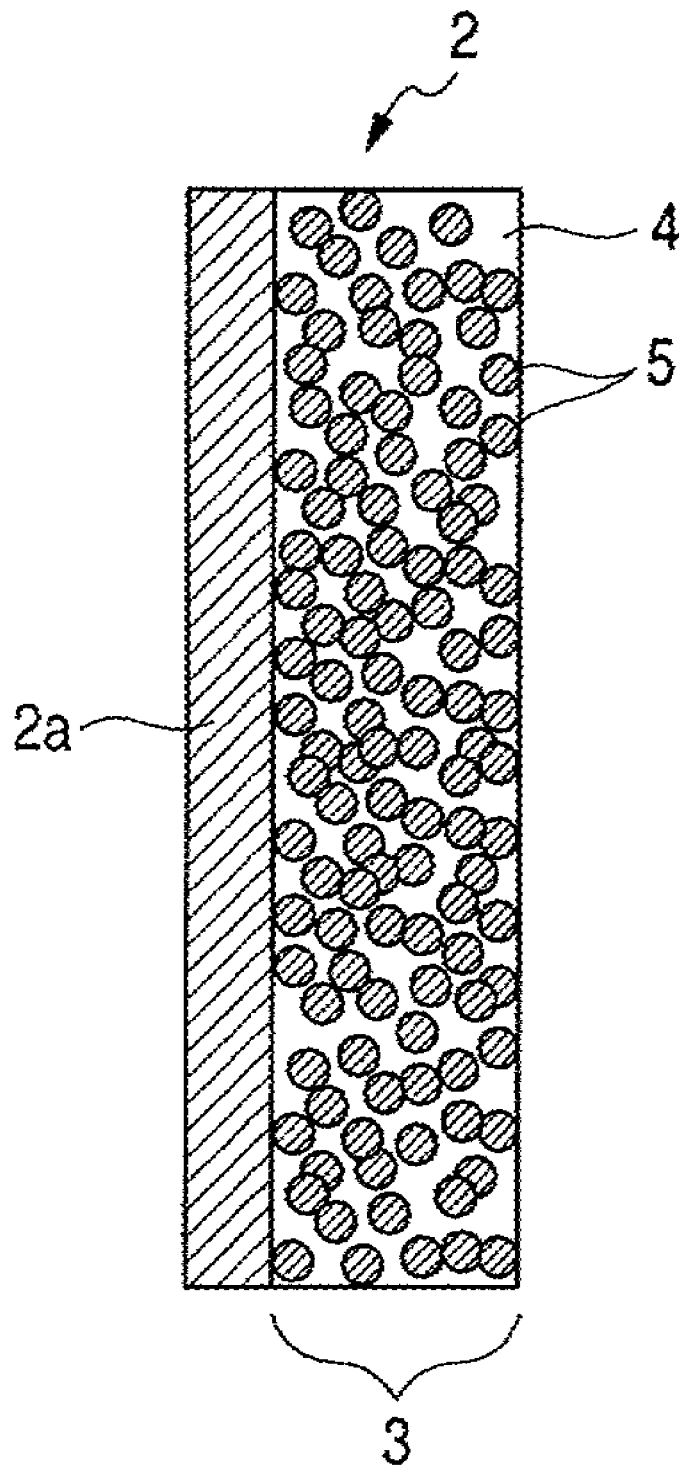
FIG. 6 is a schematic structural view illustrating a structure of a short-circuiting circuit according to Embodiment 5 of the present invention.

FIG. 5 is a schematic structural view of a fuel cell apparatus according to Embodiment 5 of the present invention. FIG. 6 is a schematic cross-sectional view illustrating the structure of a short-circuiting circuit 2 of FIG. 5.

Incidentally, in FIGS. 5 and 6, the elements which are the same as those shown in FIGS. 1 to 4 are identified by like numerals or symbols.

In the fuel cell apparatus according to Embodiment 5, power generation is performed by using hydrogen gas as a fuel and the atmosphere as an oxidizer.

Hydrogen as the fuel is stored in a fuel tank 8 while being compressed. Further, the initial pressure of hydrogen is about 1 MPa at room temperature.

In order to keep the output of the fuel cell constant, in this embodiment, there is provided a pressure-regulating valve 9.

The pressure-regulating valve 9 is adjusted such that the pressure of the hydrogen gas supplied to the power generation portion 1 is 0.1 MPa.

For the power generation portion 1 of Embodiment 5, there is used a fuel cell stack 10 in which a plurality of membrane electrode assemblies 11 are stacked on each other.

The fuel cell stack 10 has a structure in which, as shown in FIG. 5, the membrane electrode assemblies 11, atmosphere supply layers 12, fuel supply layers 19, and separators 13 are stacked on each other.

The short-circuiting circuit 2 was formed as described below. 10 g of mesocarbon microbeads (MCMB; manufactured by Osaka Gas Chemical Co. Ltd.; grain diameter: about 10 µm) and 10 g of a 10 wt. % N-methylpyrrolidone (NMP) solution of a water absorbing material 4 (AQUA CALK (trade name); manufactured by SUMITOMO SEIKA CHEMICALS CO., LTD.) were mixed in a planetary ball mill for 30 minutes to prepare a slurry.

After that, a copper foil having a thickness of 16 µm was used as a conductive member 2a, and the slurry was applied to a surface in a thickness of 100 µm to prepare a sheet-shaped switch 3 such as shown in FIG. 6. The sheet was cut into a piece which had a length substantially equal to the total thickness of the fuel cell stack 10 and a width which was about one tenth of the width of the stack.

The thus cut sheet was attached to the fuel cell stack 10 so as to be in contact with each of the layers thereof, and was adhered thereto by removing the solvent by keeping at the temperature of 120° C., thereby forming the short-circuiting circuit 2.

Next, the operation at the time of activation or suspension of the fuel cell according to Embodiment 5 will be described.

The fuel cell stack 10 provided with the short-circuiting circuit 2 prepared as described above is short-circuited because of containing only a small amount of water therein in the initial state.

When hydrogen is supplied to the fuel supply layer 19 to start power generation, water is generated in the membrane electrode assembly 11.

When the water is absorbed by the water absorbing material 4 contained in the short-circuiting circuit 2 adhered to the fuel cell stack 10, the water absorbing material 4 expands.

As a result, conductivity between MCMB as the conductive elements 5 is lost, so that the short-circuited state is cancelled.

Next, when an external load is disconnected and the fuel supply is suspended to terminate the power generation, the generation of water due to the power generation stops, whereby the water absorbing material 4 is gradually dried. As a result, the volume of the water absorbing material 4 decreases, so that the MCMB in the switch 3 come into contact with one another again thereby exhibiting conductivity.

Thus, each of the membrane electrode assemblies 11 included in the fuel cell stack 10 is brought into a short-circuited state, the remaining hydrogen gas can be consumed.

According to this embodiment, by using the water absorbing material 4 containing the conductive elements 5 for the short-circuiting circuit 2, the short-circuiting circuit 2 can function as the switch 3 which can automatically open/close depending on the power generation state of the fuel cell stack 10.

By using the switch 3, the short-circuiting circuit 2 which can automatically open/close in a small space can be structured, so that the fuel cell can be reduced in size.

Embodiment 6

In Embodiment 6, a structure is adopted such that a switch 3, in which an electrolyte material also serving as a water absorbing material contains conductive elements 5, is included in an electrolyte membrane 1a.

Figure 7:
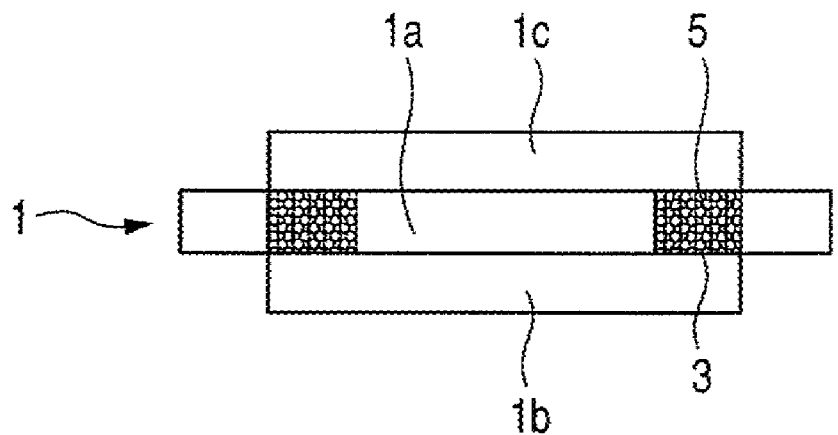
FIG. 7 is a schematic structural view of a fuel cell apparatus according to Embodiment 6 of the present invention.
Figure 8:
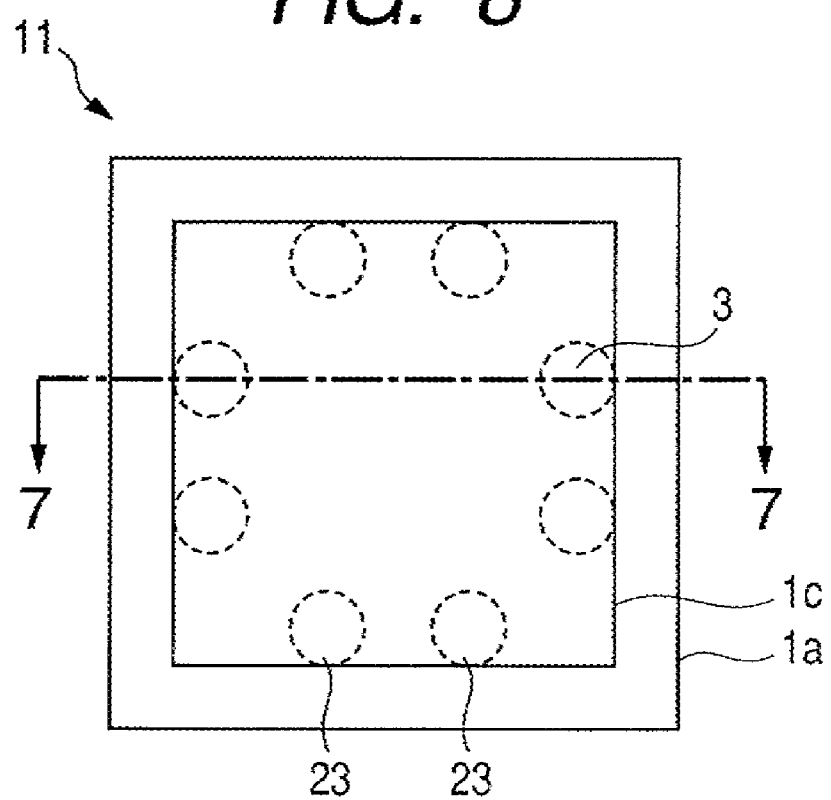
FIG. 8 is a schematic plan view illustrating a structure of a membrane electrode assembly according to Embodiment 6 of the present invention.

FIG. 7 shows a schematic sectional view of a fuel cell apparatus according to Embodiment 6 of the present invention. FIG. 8 is a schematic plan view of a membrane electrode assembly 11 of the fuel cell apparatus shown in FIG. 7. FIG. 7 is a cross-sectional view taken along the line 7-7 of FIG. 8.

Next, a manufacturing procedure of the fuel cell apparatus according to Embodiment 6 will be described.

First, a piece is cut out from Nafion (trade name; manufactured by DuPont) membrane having a thickness of 125 µm to prepare an electrolyte membrane 1a. Then, as shown in FIG. 8, through-holes 23 each having a diameter of 5 mm are made therethrough.

1 g of MCMB is added, as conductive elements 5, to 5 g of a 5 wt. % IPA solution of Nafion, and the whole is stirred thoroughly until the MCMB is uniformly dispersed therein, thereby preparing a slurry.

The through-holes 23 provided in the electrolyte membrane 1a are filled with the slurry, and then the solvent is dried.

Thus, a switch 3 for opening/closing a short-circuiting circuit between the both electrodes of the membrane electrode assembly 11 is included and formed in the electrolyte membrane 1a.

Next, a paste including carbon powder carrying platinum fine particles and a proton conductive polymer material is applied to the both surfaces of the electrolyte membrane 1a by screen printing to form an oxidizer electrode 1c and a fuel electrode 1b. At this time, the paste is applied such that the both surfaces of the switch 3 are covered with the catalyst layers of the oxidizer electrode 1c and the fuel electrode 1b.

The thus prepared power generation portion 1 is used to form a fuel cell by following the same procedure as in Embodiment 5.

Next, the operation at the time of activation or suspension of the fuel cell according to Embodiment 6 will be described.

In the initial state, the amount of water in the electrolyte membrane 1a is small, so that the volume thereof is small. Therefore, the MCMB as the conductive elements 5 are in contact with one another, so that the power generation portion 1 is in a short-circuited state.

When hydrogen as a fuel is supplied into the fuel electrode 1b through an activation operation, a power generation reaction is caused between the hydrogen and oxygen of the atmosphere existing in the oxidizer electrode 1c with the result that an electric current flows through the short-circuited switch 3. At this time, water is generated in the electrolyte membrane 1a, so that the electrolyte membrane 1a expands. The expansion is also caused in the switch 3 in the same manner, so that the MCMB as the conductive elements 5 become distant from each other, thereby bringing the switch 3 into an open sate.

Further, when an external load is disconnected and the supply of hydrogen as the fuel gas is stopped to end the power generation, the generation of water stops and the electrolyte membrane 1a is gradually dried. When the electrolyte in the switch 3 is dried, the volume thereof decreases, so that the MCMB as the conductive elements 5 come into contact with one another, thereby resulting in a short-circuited state.

In the short-circuited state, an electric current flows through the switch 3, so that hydrogen remaining in the fuel electrode can all be consumed.

In Embodiment 6, as described above, the structure is adopted such that the electrolyte membrane 1a includes the switch 3. With this structure, it is not required to provide a circuit outside the power generation portion 1. Therefore, an additional space for providing the circuit is not required, so that a space can effectively be utilized.

According to the structure of the present invention as described above, the connection to a short-circuiting circuit for the warm up of a fuel cell at the time of activation thereof and the consumption of a fuel at the time of suspension thereof can automatically be performed.

Although the description has been made by taking, as an example, the structure in which the switch which opens/closes depending on the amount of water in the electrolyte membrane 1a is used for the short-circuiting circuit for consuming residual gas which causes degradation at the time of suspension of the operation or for performing warm up at the time of activation at low temperatures, the present invention is not limited thereto.

In addition to the above-described structure, the switch can also be used, for example, as an automatic control switch for a fan which is activated when the amount of water in the electrolyte membrane 1a exceeds a predetermined value and is suspended when the amount of water in the electrolyte membrane 1a falls below the predetermined value. In this case, the structure of the switch is changed such that when the water amount is large, the switch is closed and when the water amount is small, the switch is opened, and the switch is inserted into a drive circuit of the fan.

Alternatively, the switch can also be used for various applications including a switch for a signal transmitting circuit for transmitting the driving state of a fuel cell to an external device or the like.

Further, two or more fuel cells according to the present invention may be used while being connected in series or in parallel, or the fuel cell can be used for a fuel cell system in combination with a power source, a device, a circuit, and the like.

At that time, by using the switch according to the present invention, the circuit or the like of the fuel cell stack or fuel cell system can be simplified, so that a smaller fuel cell system can be provided.

This application claims priority from Japanese Patent Application No. 2006-146200, filed May 26, 2006, which is hereby incorporated by reference herein.

The invention claimed is:

1. A fuel cell, comprising:
a power generation portion comprising a membrane electrode assembly comprising an oxidizer electrode and a fuel electrode with an electrolyte membrane interposed therebetween; and
a short-circuiting circuit comprising a switch between the oxidizer electrode and the fuel electrode, which short-circuits the oxidizer electrode and the fuel electrode when the switch is closed,
wherein the switch comprises a member that absorbs water to change at least one of a volume or an electric resistance of the member, thereby opening/closing a path of current in the short-circuiting circuit.

2. The fuel cell according to claim 1, wherein the switch is comprised of a water absorbing material which changes the volume of the member in accordance with an amount of water contained therein.

3. The fuel cell according to claim 2, wherein the water absorbing material contains therein an electroconductive element.

4. The fuel cell according to claim 2, wherein the water absorbing material is disposed in contact with the membrane electrode assembly.

5. The fuel cell according to claim 2, wherein the water absorbing material is disposed on an oxidizer gas flow path.

6. The fuel cell according to claim 2, wherein the water absorbing material is interposed between the oxidizer electrode and the fuel electrode.

7. The fuel cell according to claim 2, wherein the water absorbing material is included in a part of the electrolyte membrane.

* * * * *